United States Patent [19]
Joyce et al.

[11] Patent Number: 5,923,490
[45] Date of Patent: Jul. 13, 1999

[54] HIGH SPEED SEARCHING OF DIGITAL CASSETTE

[75] Inventors: Gerald J. Joyce, San Jose; James V. Schimandle, Morgan Hill; Dennis C. Stark, Los Gatos, all of Calif.

[73] Assignee: Xerox Corporation, Stamford, Conn.

[21] Appl. No.: 08/890,095

[22] Filed: Jul. 9, 1997

[51] Int. Cl.⁶ .................................................. G11B 15/18
[52] U.S. Cl. ......................................... 360/72.1; 360/72.3
[58] Field of Search .......................... 360/71, 72.1, 72.2, 360/72.3, 74.2, 74.3, 31, 50; 369/53

[56] References Cited

U.S. PATENT DOCUMENTS

| 4,125,881 | 11/1978 | Eige et al. ................................. 360/50 |
| 4,398,300 | 8/1983 | d'Alayer de Costemore d'Arc et al. ........................ 360/72.3 X |
| 5,179,479 | 1/1993 | Ahn ......................................... 360/72.1 |

FOREIGN PATENT DOCUMENTS 61-85688   5/1986   Japan .

*Primary Examiner*—Paul W. Huber
*Attorney, Agent, or Firm*—Robert Cunha

[57] ABSTRACT

A searching and block access method on a digitally recorded continuous web media. The method enables a digitally recorded tape to be randomly positioned to access a specific requested data block. This method does not rely on scanning the information recorded on the tape to locate a requested data block. The tape is shuttled at high speeds to randomly requested locations. Tape positioning and control is accomplished by profiling the motion required to position the tape at the requested block relative to any current tape position. A tape directory of contents and tape position is recorded on the tape and cached within the drive controller. The cached version of the tape directory is used for random accesses. The random access ability enables the tape implementation to perform disk storage emulation.

2 Claims, 14 Drawing Sheets

HIGH SPEED SEARCHING OF DIGITAL CASSETTE

BACKGROUND OF THE INVENTION

A method of searching a digital recorded tape for a block of information by first mathematically determining the present location of the tape on the spool, and the number of revolutions that must be turned, and then counting the number of revolutions turned at high speed to arrive at the desired location.

Digital recorded tape, because of its slow access time and low cost, is normally used for back-up storage and for archives, or to access large records if long access times can be tolerated. Worst case times of 40 to 60 seconds would be typical. A hard disk or floppy is used for records that must be accessed faster, but the cost per bit is considerably higher. The reason that the access time of digital recorded tape is so long is that the current implementations scan the digital recorded information for location marks. The location marks are examined in a sequential manner until the requested location is found. There is a limit to the speed at which the recorded tape in contact with the read head can be driven while still allowing the read head to actually read location marks on the tape. Small computers use disks rather than tape as the main system mass storage memory because of this slow speed and the resulting long access time.

The top speed at which the tape can be driven would be significantly increased if the recorded tape were removed from contact with the read head. In this case, the current position of the tape and the relative distance to reach the requested target data block and an estimate of the time it would take for the tape to reach the target data block would be needed. Using the method, the tape would be advanced at high speed, retracted within the tape cartridge, to an approximate position of the target data block requested, the tape would be placed in contact with the read head(s), the exact position of the tape would be determined, and the tape would continue to be driven forward to the target data block. This method may still not be fast enough. In the many cases, after the high speed positioning approximation process, the tape may be too far from the target location mark in either a forward or reverse direction. A learning process applied to the high speed approximation process will correct most of these deficiencies.

U.S. Pat. Nos. 4,125,881, 4,398,300 and 5,179,479 describe similar systems and are incorporated herein by reference. Mathematical equations are used to predict on a dead reckoning basis when the tape is approaching the desired target, based on the encoded motion and the thickness of the tape on the encoded reels. However, the accuracy of these systems is not sufficient to stop the tape within a suitable distance of the desired target.

Japanese Publication No. 61-85688 to Matosudaas understood, describes a system where a Ram 5 contains a table of music recording numbers and a corresponding table of counter counted values. For each selection, the count of the target counter value is stored in RAM 41, the tape starts at the beginning and advances at high speed, while counting encoder pulses until the target counter count is reached. No computation of reel rotations is described.

In order for the access time of digital recorded tape drives to improve to the point where they are competitive with disk storage systems, a considerable improvement in the worst case access time would have to be accomplished.

SUMMARY OF THE INVENTION

This system decreases the access time by retracting the tape from the read and write head(s) and driving the tape at speeds of 500, or more, inches per second while the tape is contained within the tape cartridge. The system knows the tape length from the current data block to the target data block by keeping a running encoder, or line, count of tape hub rotations, locating each data block at an exact count location, and keeping a record of the position of every data block recorded on the tape.

To determine the diameter of the pack of tape on the spools, if that is not known, the supply spool is rotated through a predetermined angle and the angular displacement of the take up spool is read out. The amount of tape on the spool can be determined from these. The use of the encoder counts, as well as the tape and pack thickness, enables a superior dead reckoning estimate.

To reach a new data block, the tape is accelerated to an optimum speed, maintains that speed for the calculated time and encoder count values and then decelerates the tape, to stop it within a fraction of a data block before the start of the requested target block. The tape is then engaged into contact with the read and write heads, and proceeds in the forward read mode to the start of the requested target block.

DETAILED DESCRIPTION OF THE INVENTION

Figure 1:
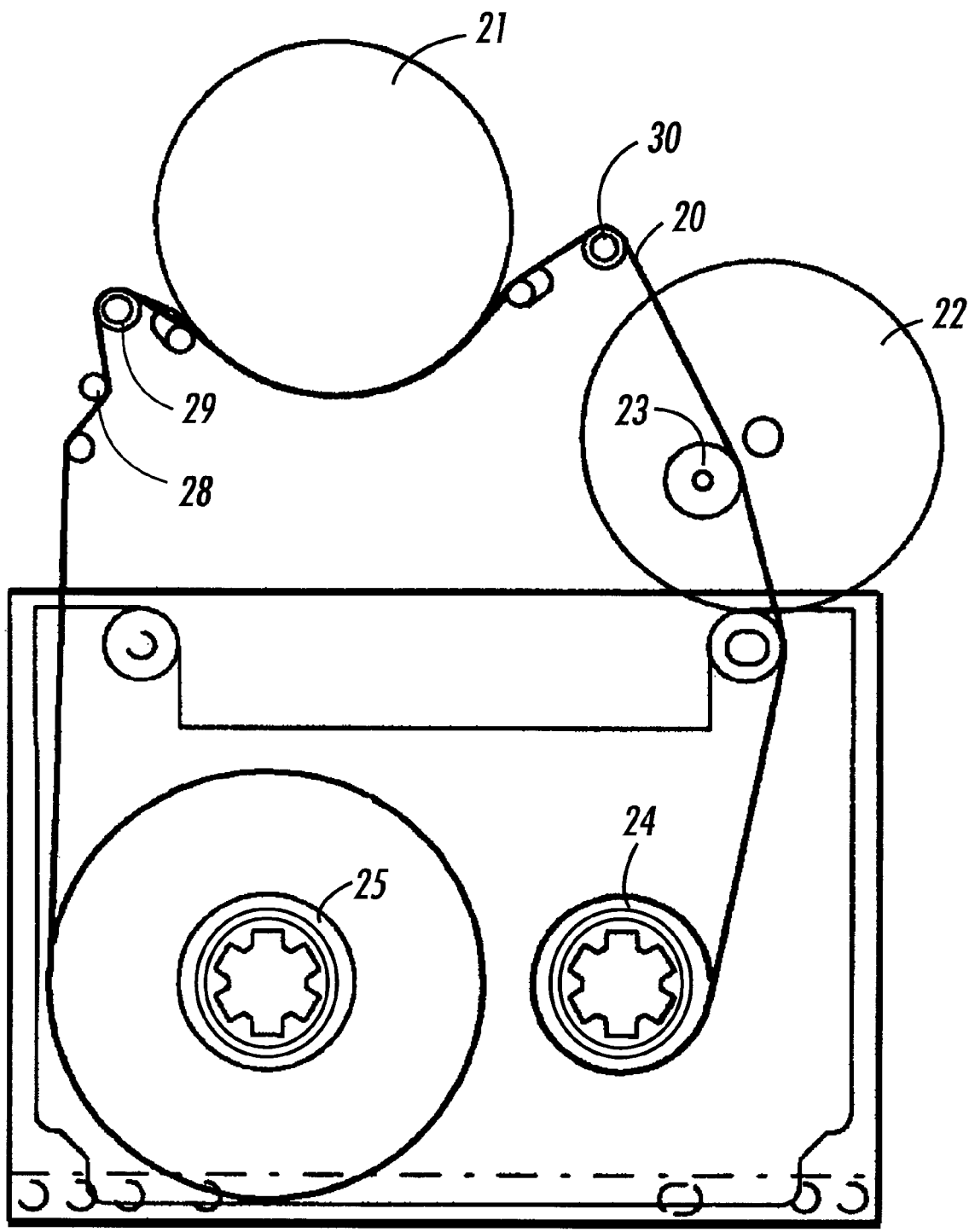
FIG. 1 is a diagram of a prior art tape deck during a tape data block access.

FIG. 1 is a diagram of a typical tape deck, shown in the fast forward or rewind position. The tape 20 is being transferred from one reel 25, to the other 24. The proper amount of tension is sensed by the tape tension arm 28. The supply reel motor 25 maintains the appropriate tension for the tape path to read recorded data block marks with the head wheel 21 at tape speeds up to 50 inches per second. The capstan 22 is typically rotating at a fixed speed, but since the idler 23 is not forcing the tape against the capstan, the tape is free to travel at a faster forward speed. However, the search speed is limited by the ability of the head wheel 21 to read recorded data block marks, the complex tape path and the number of contacts points between the tape and the tape deck elements.

Figure 2:
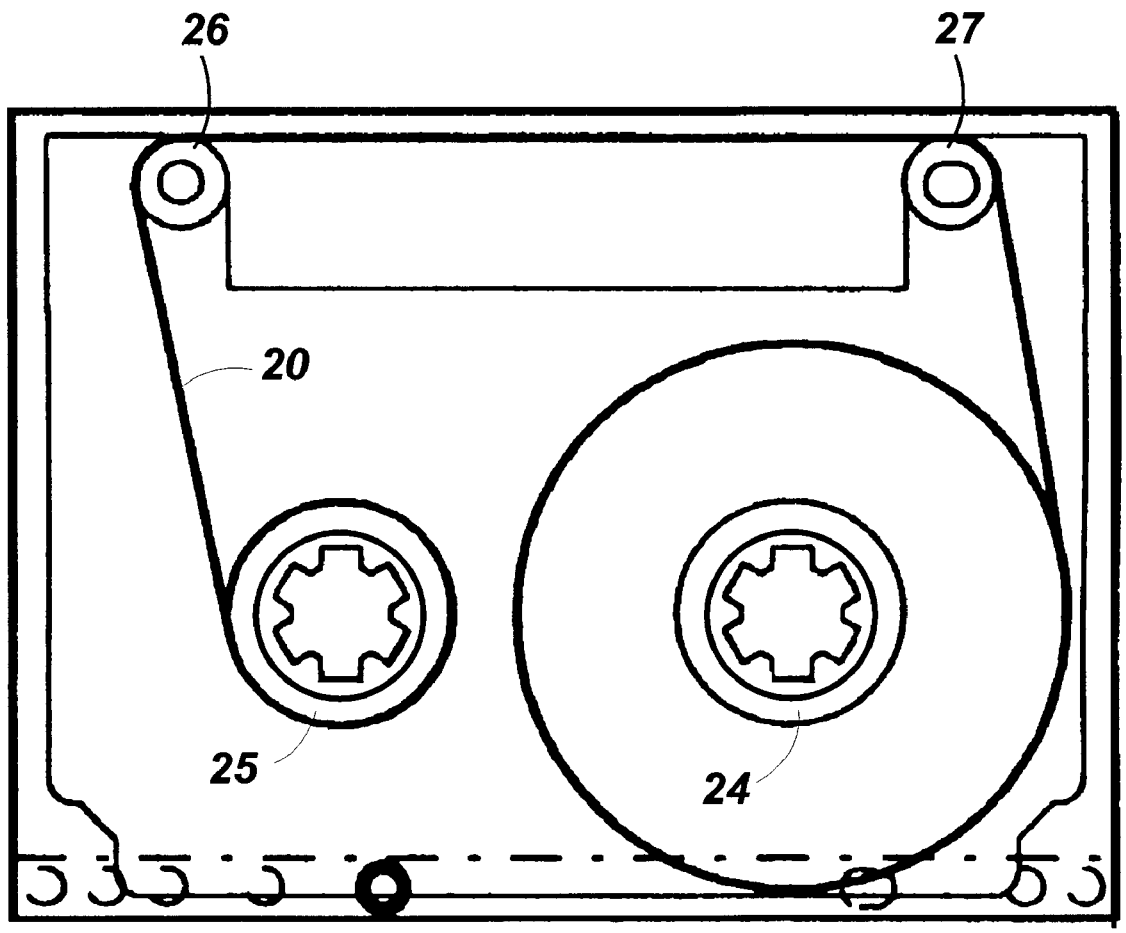
FIG. 2 shows a tape deck configuration during a high speed tape block access.

The speed of tape transfer from one reel to the other can be increased by using the tape shuttle configuration of FIG. 2, where the tape 20 is simply transferred from one reel to the other. In this case, the only elements in contact with the tape are the tape guides 26, 27. The relative tape distance to the requested tape data block is determined and the tape is shuttled the predetermined distance, without removing the tape from the cartridge, instead of reading recorded tape position marks as in the FIG. 1 configuration. The requested data block's location is retrieved from the mounted tape's cached directory, FIG. 8.

Figure 3:
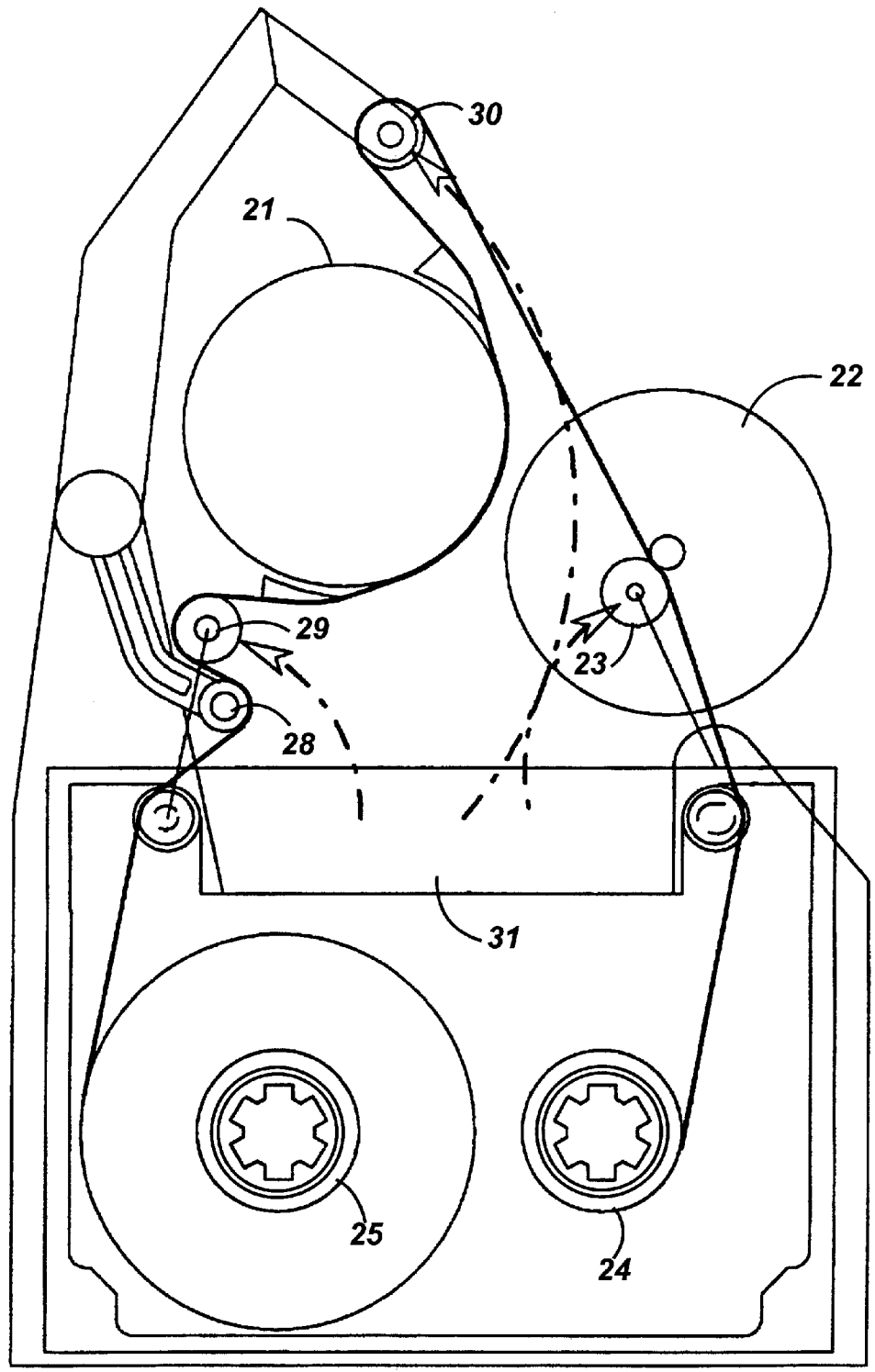
FIG. 3 shows how a tape deck can be converted from read/write to high speed transfer.

One mechanism for converting the tape dick between these two configurations is shown in FIG. 3. In the read or record mode, as shown, the tape from the first reel 24 contacts the guide 27, is controlled by the nip between the capstan 22 and idler 23 which controls the tape speed, goes around the head wheel guide 30, contacts the head wheel 21, is put under tension by tensioners 28, 29 and is guided around guide 26 to the other reel 25. When a high speed tape transfer is required, the tensioner 29, the idler 23 and the guide 3 are all retracted down into space 31 so that the tape is allowed to run unimpeded directly between guides 27, 26.

Figure 4:
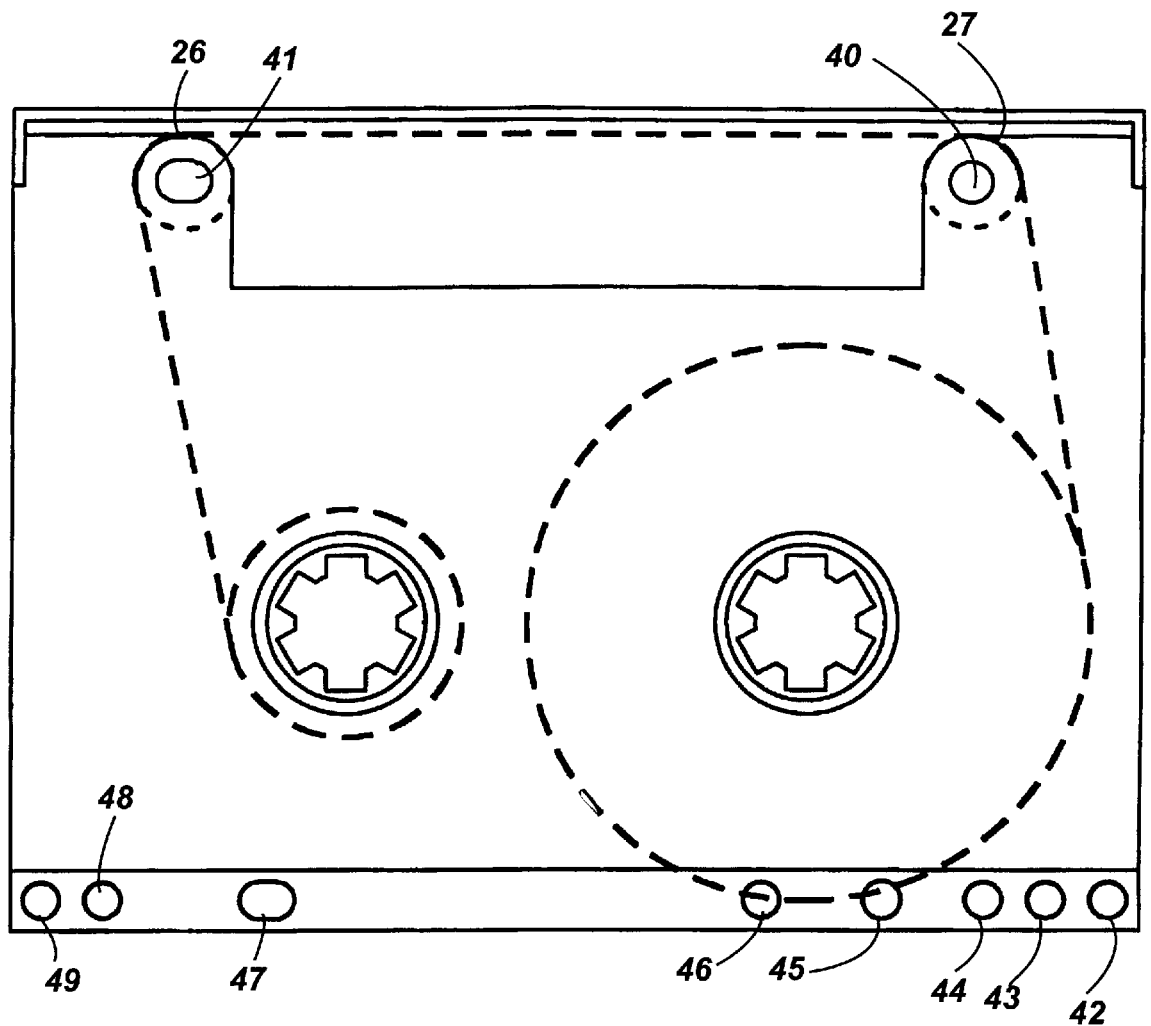
FIG. 4 is a cartridge which can be used for high speed block access with this system.

The cartridge shown in FIG. 4 provides indicators to determine the tape media type and cartridge characteristics. High speed operations (over 90 inches per second) must be limited to cartridges capable of supporting high speed operations. FIG. 4 is an example of a highspeed, DDS Digital Audio Tape (DAT) industry standard cartridge having a standard hub diameter and incorporates a number of media recognition, sensing and datum holes 40–49. Some specific datum holes are the high speed indication hole 46, the file protect hole 48 and the datum holes 40, 41 which identify the location of guides 26, 27. The remaining holes 44, 45, 46 and 49 form an encoded group that specify the cartridge type, media thickness and length.

Figure 5:
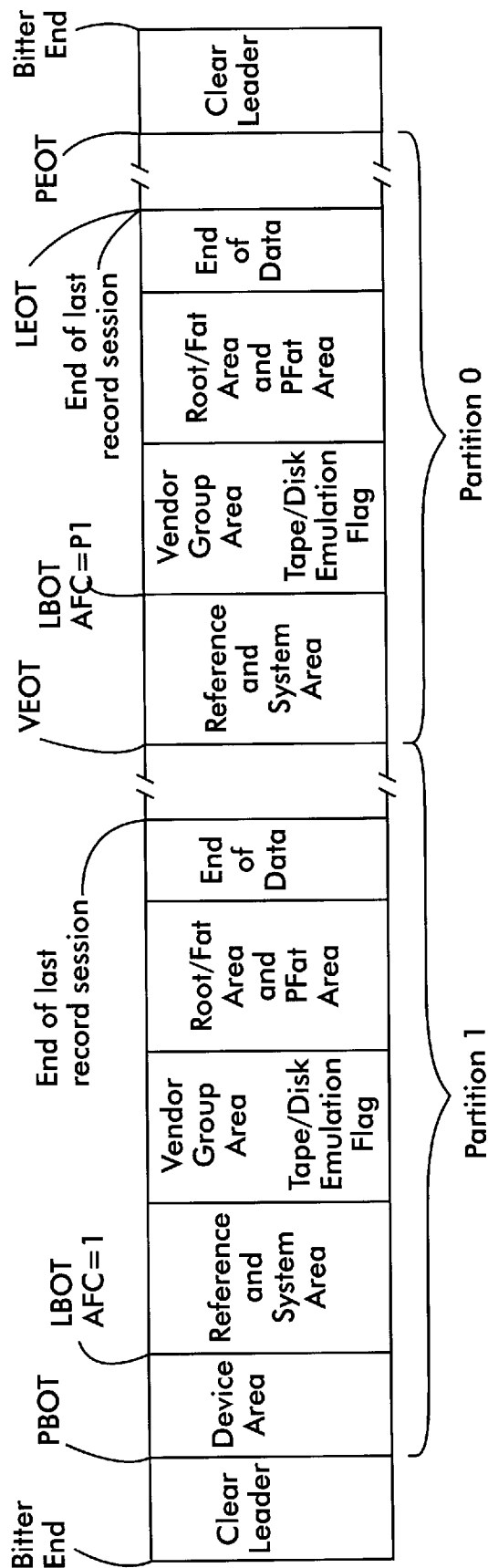
FIG. 5 is a diagram of the DDS blank tape cartridge initialization format for DOS disk emulation.

The DDS blank tape cartridge initialization for the Tape/Disk emulation format is shown in FIG. 5. This figure is an example of tape formatting within the DDS standard to implement disk emulation. The tape has a length of clear leader at the beginning, followed by the start of the web, the first part of which is called the Physical Beginning Of the Tape "PBOT". The reel encoder counters are set (A and B) to initial values appropriate to the mounted cartridge's media length and thickness. This process can be applied to any other recording format, DDS is used here as an example.

The first portion of the tape is the Device Area where vendor specific data is recorded. The point on the tape immediately after the Device Area is the Logical Beginning Of the Tape, "LBOT". The supply (A) reel encoder counter value at the LBOT point is recorded on the tape. Once the encoder counter value for LBOT is recorded, this value becomes the datum the LBOT for all future sessions with the cartridge regardless of which drive mechanism the cartridge is mounted on. The DOS Absolute Frame Count (AFC) is set to "1". Future mountings of the initialized and recorded tape will retrieve and set the LBOT into the reel encoder counters to insure that minimal error is introduced by mounting on different mechanisms. Every AFC that is recorded on the tape will contain the supply (A) reel encoder counter value when it is recorded. The supply (A) reel encoder counter value (distance from the beginning of tape) for each recorded file data block is also recorded in the tape's directory file. The tape's directory file indicates the current recorded contents of the tape and the file's distance from the beginning of the tape.

Combining the capabilities of dead reckoning positioning on the length of the tape, tape recorded encoder counter value positions and tape directory caching enables a true random access capability from any point to any point on the length of the tape. To take advantage of the random access capability the tape drive controller's software or firmware emulation set will allow the tape drive to appear to be a tape or a disk to the host System. The Tape/Disk flag is set if the mounted tape cartridge is recorded to emulate a disk.

FIG. 5 shows an example of a tape recorded for the DOS-Windows operating system mass storage environment. The tape contains two partitions for the Tape/Disk emulation. Thefirst partition (Partition 1) contains tape directory and storage allocation information. The second partition (Partition 0) contains the stored file data blocks. Once the tape cartridge is mounted, directory and storage allocation data (ROOT/FAT and PFAT Area) are cached in the controller and all further updates (additional tape record sessions) will be made to the cached copy of the tape directory. The updated directory and storage allocation data are appended after the previously retrieved directory and storage allocation data recording when the tape cartridge is removed from the system.

The first tape area following the clear leader is the Device Area. The next tape area is the Reference and System Area. Between the two areas is the Logical Beginning Of Tape "LBOT" in which is recorded the encoder counter value or distance to PBOT for Partition 1. In the next tape area, there is space for recording the physical file allocation table "PFAT" which is a table in which each line is an identification of a data block and the encoder count value of the tape location for that block. Also recorded in this area is the DOS ROOT directory to be described with reference to FIG. 6, and the DOS File Allocation Table (FAT). ROOT and FAT are DOS) specific date that must be supplied to DOS or DOS-Windows each time the tape cartridge is mounted. During the course of using the tape as files are written or modified, these tables will be created or update as required. Also in this data area will be a space for the tape directory position table if the tape is not being used in the disk emulation mode. "VEOT", Virtual End Of Tape, separates the two partitions. In all cases, all files will in this example be recorded to be compatible with the DDS DAT format standard. Finally, data is entered into Partition 0, the data partition. At the conclusion of each data recording session the Logical End Of Tape "LEOT" is recorded. LEOT is overwritten at the start of each recording session.

The initial recording session of Partition 0 will carry an identical Reference and System Area and Vendor Group Area as in Partition 1 except, the Device Area will not be included since the device information be identical to that of Partition 1. Subsequent recordings within Partition 1 can continue until the Physical End of Tape "PEOT" is encountered, followed by the trailing clear leader.

Figure 6:
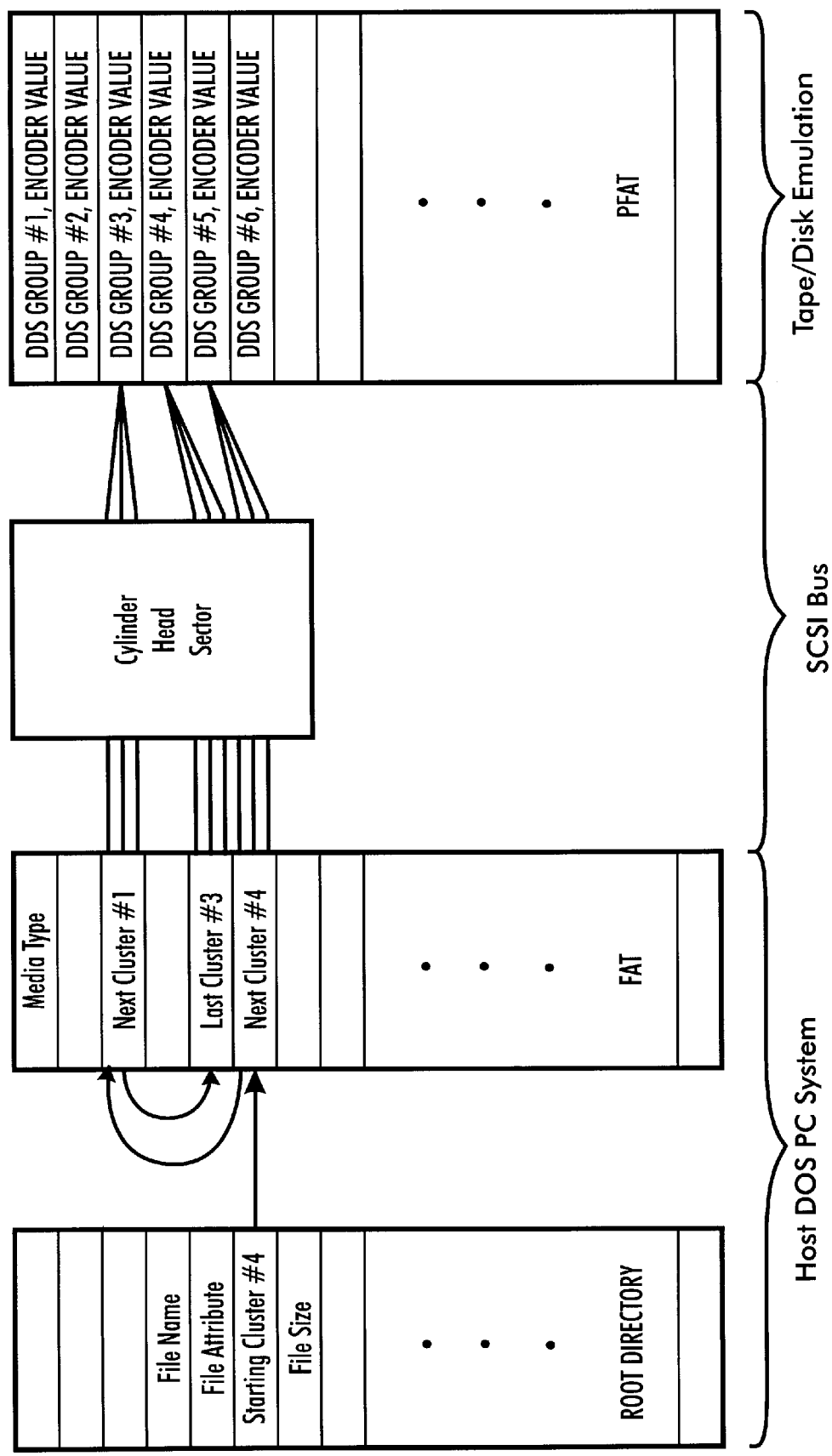
FIG. 6 shows the disk operating system "DOS" or DOS Windows version of the removable media Tape/Disk emulation file system.

FIG. 6 shows the disk operating system "DOS" or "DOS Windows" version of the removable media Tape/Disk emulation file system. The Physical File Allocation Table "PFAT" segments the tape storage into units called DDS Groups. Here the Physical File Allocation Table shows the tape being segmented into DDS Groups, each having a unique encoder counter value. The host DOS PC system will request a file in it's ROOT directory based on the file name. The file's attribute, the file's size, and file's starting Cluster will be examined. The DOS File Allocation Table "FAT" allocates mass storage in units called Clusters. Clusters are marked as unused or used as storage is consumed. The starting Cluster retrieved during the file access process indexes to the physical start of the storage that was previously allocated for the stored file. Assume Cluster #4 for the example shown. Each allocated Cluster will point to the next allocated Cluster for the stored file until the last Cluster is encountered. Finally, the SCSI bus will pass the indexed Cluster access address to the Tape/Disk emulator in the form of a physical storage address; Sector, Head and Cylinder designations. The tape is emulating a Tape/Disk in this case, and the PFAT table will output the corresponding encoder counter value for the DDS group chosen.

Figure 7:
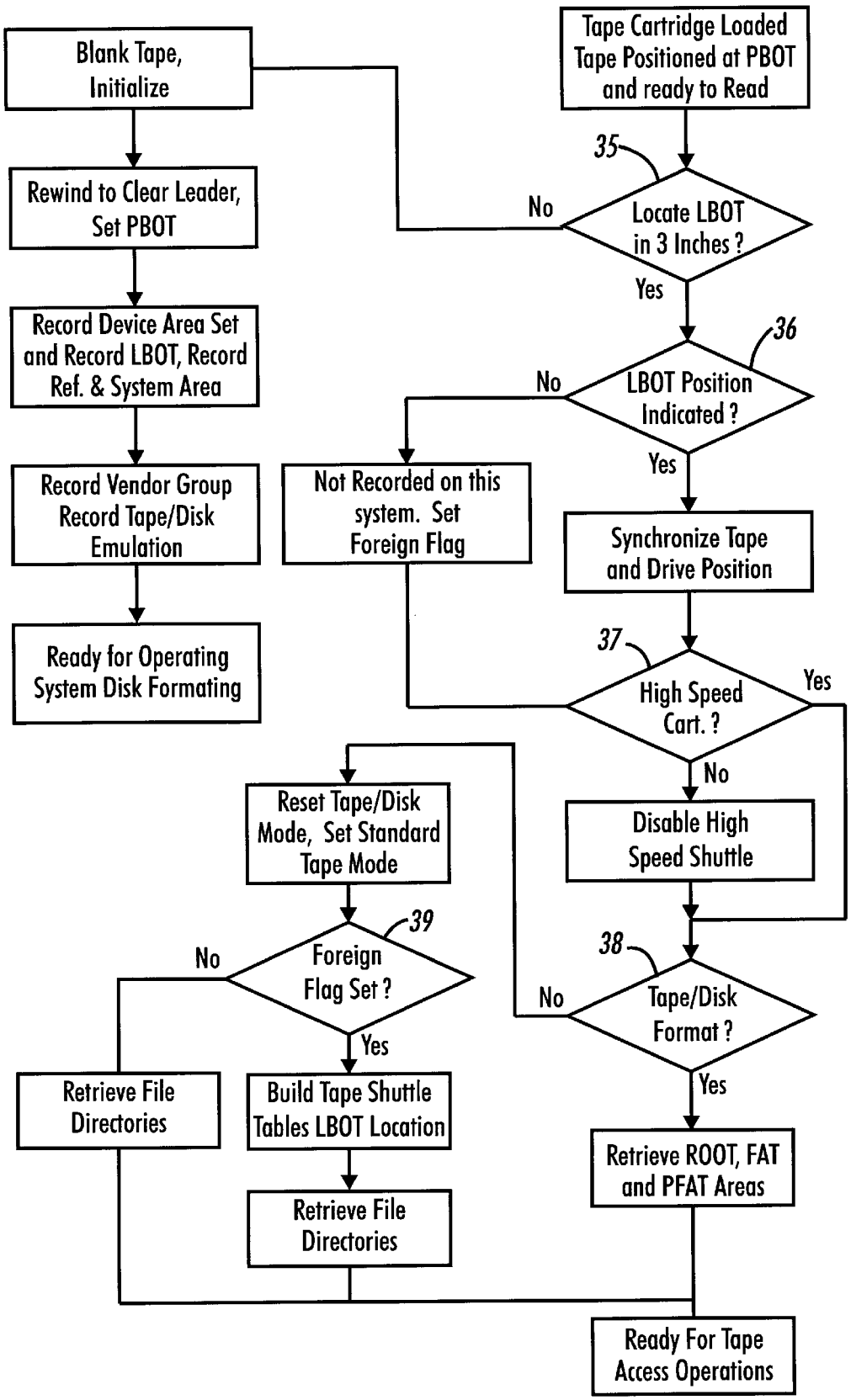
FIG. 7 is the process of determining whether a tape format is a Tape/Disk emulation, tape emulation or a recording not recorded on this mechanism.

When a tape is mounted on the drive, the system must recognize the tape as either having a Tape/Disk emulation format, a native tape format or a tape format that is foreign to this mechanism, or not understood. The process, which is consistent with DDS/DAT industry standards, is illustrated in FIG. 7.

At step 35 the tape is read for a maximum of twenty inches to locate a Logical Beginning Of Tape (LBOT) mark. If there is none, the tape is assumed to be blank and not initialized. The tape is initialized by recording all of the data areas shown in Partition 1 and Partition 0 of FIG. 5. If the LBOT mark is found in the initial twenty inches, but an LBOT encoder counter value is not detected in step 36 this is an indication the tape was not recorded on a compatible mechanism. A flag that identifies the tape as foreign is set. If the LBOT encoder counter value position is indicated, in step 36, the tape cartridge and drive mechanism are synchronized. The A and B encoder counter values are set to reflect the LBOT offset from PBOT. The Physical Beginning of Tape (PBOT) occurs at the transition from clear leader to recording media on the takeup reel (B). The LBOT is recorded shortly after PBOT position was encountered. The LBOT was previously stored on the tape. This value is set into the reel motor encoder counters of the drive mechanism and the tape identification process proceeds.

Next the cartridge data holes are inspected at step 37 to determine whether the cartridge is capable of high speed motion. If not, the high speed search capability will be disabled and the tape shuttle speed is limited to 90 inches per second. Finally, the Tape/Disk emulation flag, located within the vendor group, is read at step 38. If this flag is not set, the foreign flag is inspected at step 39. If the tape is foreign, the LBOT must be determined; in either case the file directories are retrieved, and position tables are cached within the controller. If the Tape/Disk flag is set, the ROOT, FAT and PFAT directories are stored into the drive's controller and the tape is ready for access operations.

Figure 8:
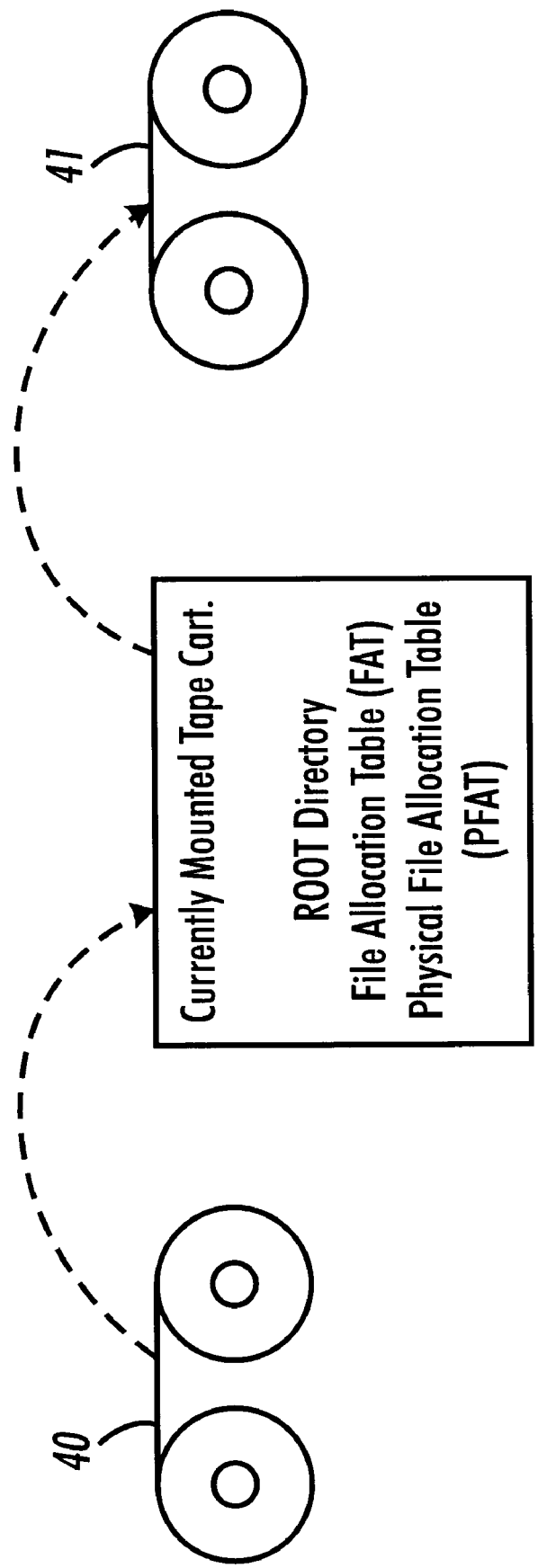
FIG. 8 shows how the directory is cached and kept current in a single tape environment.

In general, in applications where a single tape is used in a drive, all the recorded tape content information is cached and kept in the drive's controller while the tape is being used. Modifications to the current mounted tape's contents are stored into the cached copy of the tape's contents. The revised cached copy of the tape's contents is written onto the tape before the tape is removed from the drive. The recorded tape's contents are loaded back into the drive controller's cache when the tape is again mounted on the drive. FIG. 8 shows this process. When the tape 40 is mounted on the drive, current tape information, including the ROOT Directory, the File Allocation Table (FAT), and the Physical File Allocation Table (PFAT), (if not a Tape/Disk tape the tape directory) will be loaded into the drive controller's cache. As the tape is being used to store data, these tables will be updated in the drive controller's cached copy. All of these modifications will then be recorded as a separate updated copy of the ROOT directory, FAT and PFAT onto the tape 41, before it is removed from the drive.

A problem arises when a tape is removed from the drive in that the drive loses track of the current position of the physical tape on the reels unless the tape is position at the PBOT before removal. That is, after the tape is removed from the drive, the tape may be wound or unwound a significant amount before being unloaded or loaded onto the drive. To insure against this adversely affecting the system, a tape is rewound back to the beginning PBOT before it is reused in the system. Of course, this takes considerable time.

Figure 9:
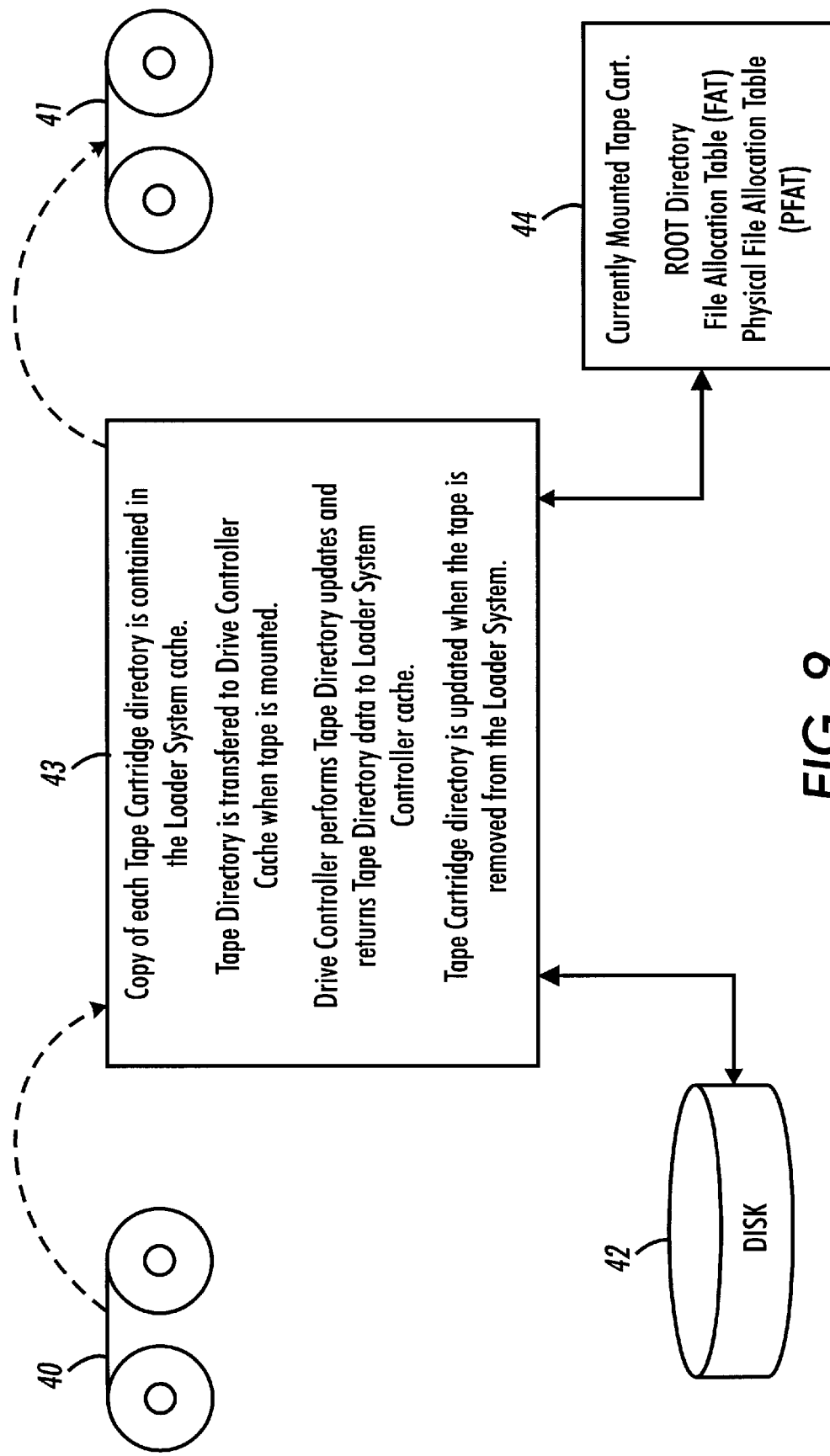
FIG. 9 shows how the directories are cached and kept current in a multiple tape loader environment.

This rewinding of tapes can be avoided by using an automatic tape loader which controls a number of tapes as shown in FIG. 9. A number of tapes 40, are installed in a loader, and as each one is mounted on the drive, all of the directory and table information is read into the automatic loader system controller, 43, and into the drive controller 44, as was the system in the previous case. The difference is that when the tape is first mounted on the drive the tape directories are stored into the automatic loader system's disk, 42, and the tape driver controller cache. When the tape is removed from the drive, if any modifications have been made, the automatic loader's disk is updated rather than the tape. The last position of the tape is also saved. This provides the capability to remove the tape from the drive at the current position. The tape does not have to be rewound to record the updates. The tape updates are performed when the tape is remove from the system or at a non-peak operating time of the system. The next time the tape is mounted on the drive, the tape does not have to be restarted from the beginning since it will be known what the last tape position was and that the tape was not moved in the interim.

Figure 10:
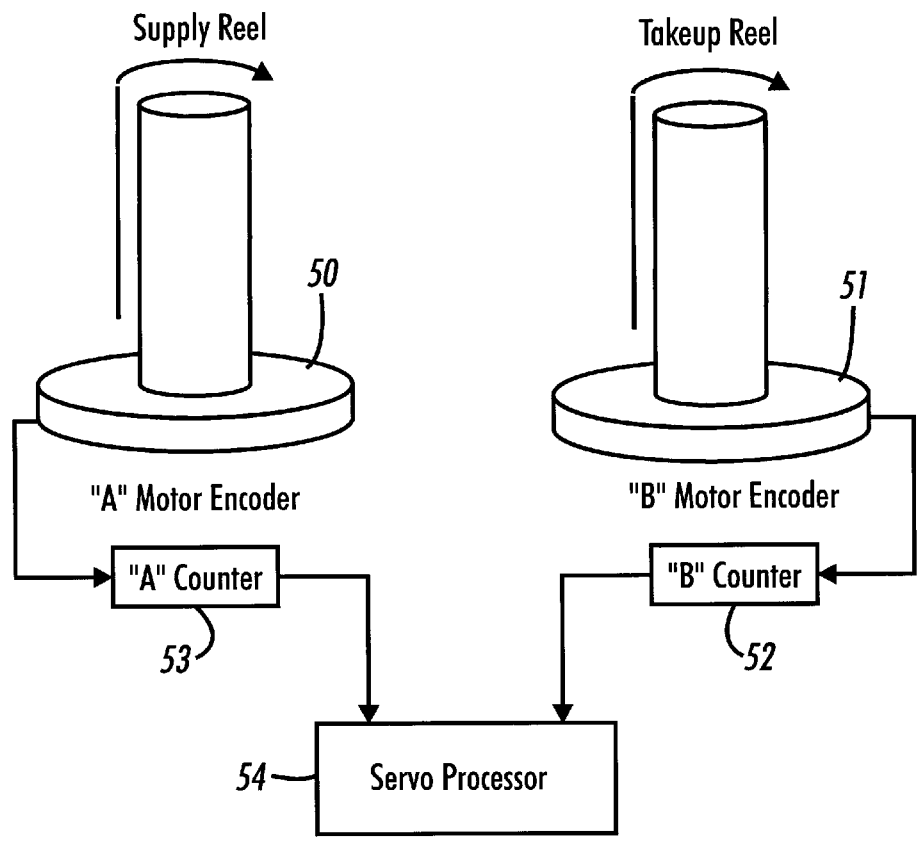
FIG. 10 is a simplified diagram of the encoder hardware.

The position of every record on the tape is associated with a count of encoder pulses which starts from the maximum count, for the identified tape length, at the start of the tape and decrement as the tape is positioned toward the end of the tape. The hardware for generating this count is shown in FIG. 10. The supply reel, 50, and the take-up reel, 51, are equipped with encodes, the pulses of which are counted by counters, 53, 52. These counts are then supplied on a continuous basis to the servo processor, 54, which associates every recorded data block location on the tape with its associated line count.

Figure 11:
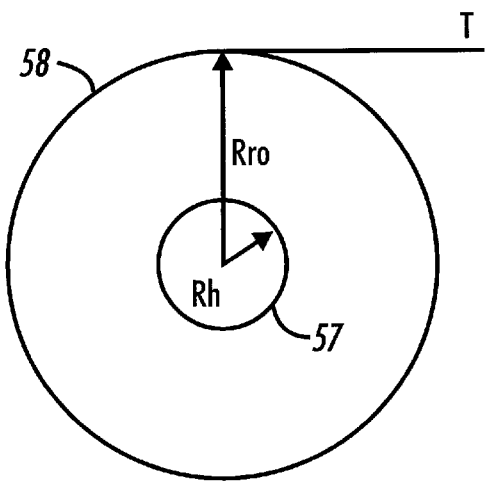
FIG. 11 is a diagram of the geometrical features of the tape on a reel.

As shown in FIG. 11 the tape is wound on each hub which has a radius Rh, the radius to the outside diameter of the tape is shown as Rro, and the thickness of one layer of tape is T. From these values, various tape properties can be calculated.

To determine the total length of tape on a reel;

let Lt=the total tape length=$pi(R_{ro}^2 - R_h^2)/T$.

Where T is one tape thickness.

To determine the relationship between total tape on the reel and theta, the number of radians of tape on the reel;

Let $R_{rc}$=the current tape pack radius, $R_{rn}$=the new tape pack radius, n=the number of encoder counts to move from $R_{rc}$ to $R_{rn}$, N=the number of encoder counts per tape reel revolution.

Then, for each revolution, $R_{rn}=R_{rc} \cdot T$, and for multiple revolutions, $R_{rn}=R_{rc}-T \cdot n/N$.

To determine the amount of tape on a full reel, using the supply tape reel encoder count:
  let $n_f$=the number of encoder counts in the full pack;
  let $R_{rc}=R_{ro}$; $R_{rn}=R_h$; $L_{po}=L_t$;
  let $L_{po}$=the length played out, $$=pi(R^2_{rc}-R^2_{rn})/T=pi[R^2_{rc}-(R_{rc}-T\cdot n_f/N)^2]/T$$

Then, $L_{po}$=pi[$2R_{rc}\cdot T\cdot n/N-(T^2\cdot n^2/N^2)]/T$
and $L_t$=pi[$2\cdot R_{ro}\cdot T\cdot n_f/N-(T\cdot n_f/N)^2]/T$.

Figure 12:
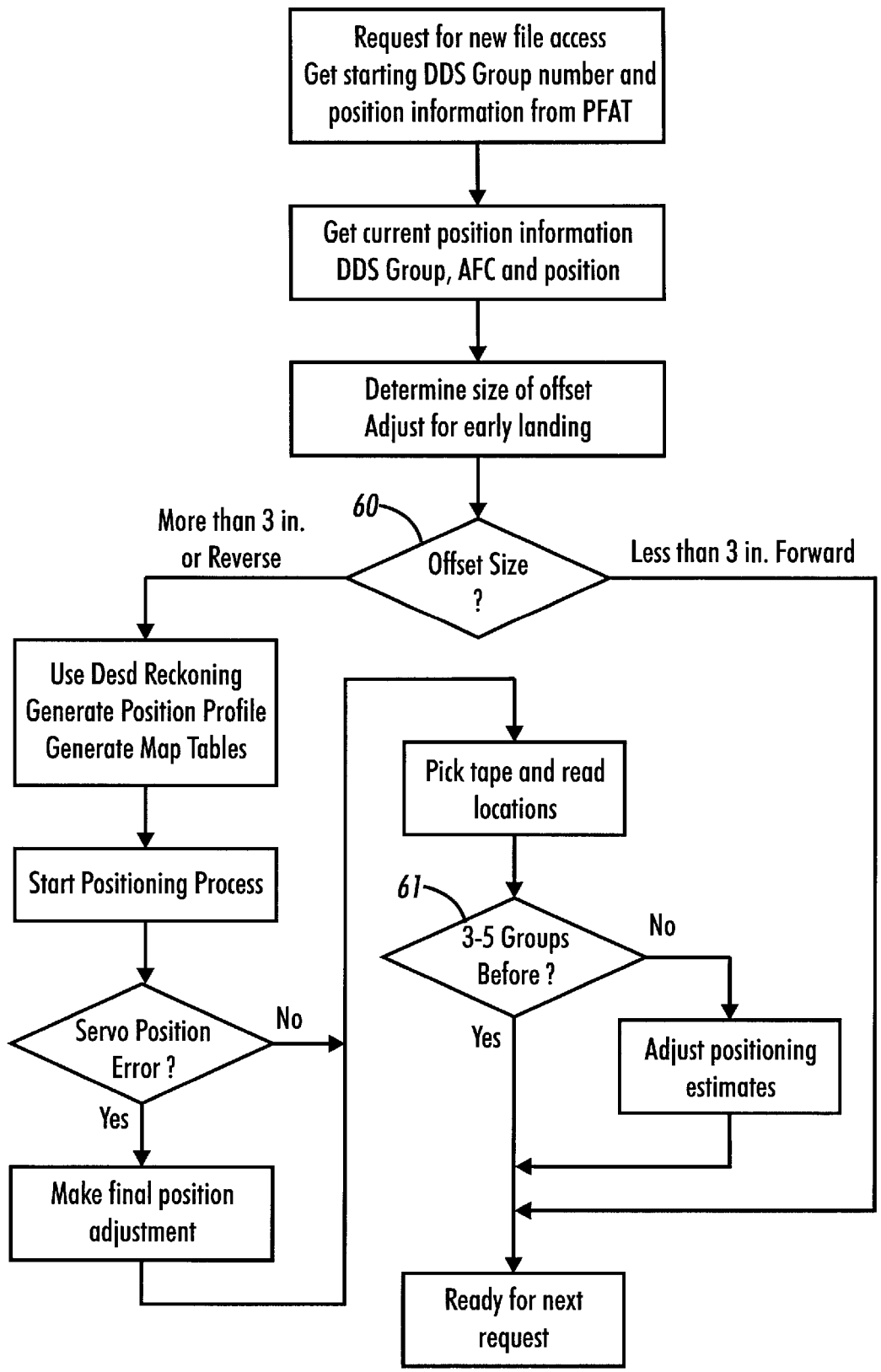
FIG. 12 is a flow chart of the tape positioning process.

If a new tape location is requested, and it is close to the current position, the tape will simply proceed to it at a speed at which the read head can read the tape locations. However, if the requested tape location is distant, the tape deck will retract the tape into the cartridge to allow dead reckoning and high speed tape shuttle on the transport. The flow chart for making this decision is shown in FIG. 12. When a request is received, the drive controller processor will get the requested DDS group number, and the encoder counter value of the target data block from the physical file allocation table. The current tape position is known by the drive controller. From this information, the distance and direction to the requested target data block can be determined.

At step 60, if the offset is calculated to be less than three inches in a forward direction, then the tape will be advanced forward at a speed at which the read head can determine the individual data block marks until the requested data block is found. In the event that the requested data block is in the reverse direction or if the data block is more than three inches from the current position the tape must be shuttled at seek speeds using the dead reckoning process.

If in step 60, the target block is determined to be more than three inches away in the forward direction, or at any distance in the reverse direction, the tape elements will be retracted and the dead reckoning process will be started. Note that the tape can not be driven in the reverse direction even a small amount because of the possibility of tape damage. The dead reckoning process is then started, the phases being acceleration, constant velocity and deceleration. At the end of this process as determined at step 62, the encoder count should beat the target encoder count. If it is not, positioning motion adjustments are made to arrive at the proper encoder counter value. After the tape is positioned at the target encoder counter value the tape is extracted from the cartridge and positioned for reading. In step 61 the first data group mark is read. In the event that the first read data group mark read is greater or less than 5 data groups away from the requested data group the dead reckoning positioning algorithm is adapted to compensate in future dead reckoning procedures.

Figure 13:
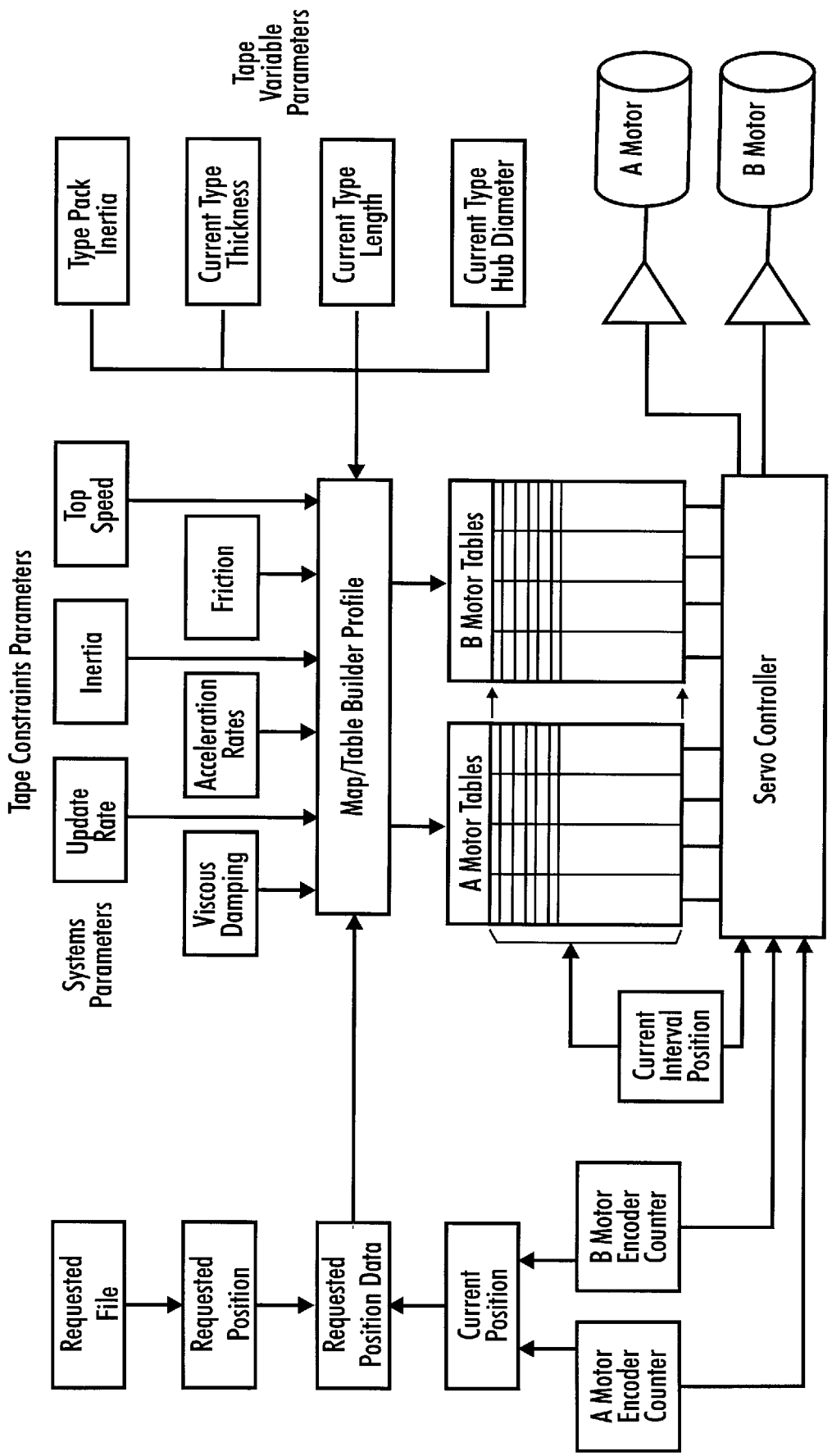
FIG. 13 is a detailed explanation of the dead reckoning process.

A more detailed explanation of the dead reckoning process is shown in FIG. 13. When a "requested file" or data block request is received, the file name is associated with the stored, appropriate data block and tape position encoder count value. The resulting requested encoder count value tape position is compared with the current position encoder count to produce a requested encoder count position delta. The Map/Table Builder uses the count delta to determine the number of map entries and the direction of the positioning process. A number of constants associated with the tape motions process are considered; viscous damping, update rate (the length of time between updating servo parameters), drive inertia, desired maximum acceleration rates, friction and maximum tape speed. A number of tape variable parameters are calculated and considered; current pack inertia, current tape thickness, current tape length and current tape hub diameter. From these the Map/Table Builder fills the A and B motor tables with a series of desired acceleration, velocity, torque and encoder count values for each of the update intervals. The interval counter then goes through the table, one interval at a time and outputs the associated values to the A and B motor servo controllers.

CONVERTING ENCODER COUNTS TO TAPE POSITION

Figure 14:
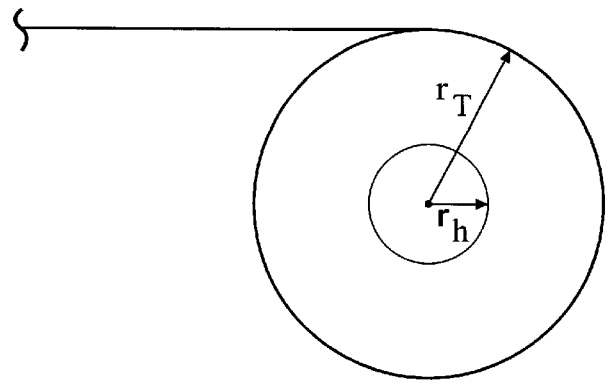
FIG. 14 is a diagram showing the hub and tape radius.

Given:
  Tape thickness (t)
  Hub radius ($r_h$), see FIG. 14
  Encoder Count ($C_p$) from point where no tape is on reel to current point
  Encoder Counts per Revolution (N)
Find:
  Length of tape currently on the reel ($l_p$)
Solution:
  The area of the linear tape as seen from the edge if the tape is stretched into a line is:

$$A_T=l_p t \qquad \text{eq. 1.1}$$

The area of the tape once it is wound onto the reel is:

$$A_R=\pi r_T^2-\pi r_h^2 \qquad \text{eq. 1.2}$$

The radius of the tape can be calculated knowing the tape thickness and the number of revolutions the reel has turned since beginning of tape:

$$r_T = r_h + \left(\frac{C_p t}{N}\right) \qquad \text{eq. 1.3}$$

Equating the two areas gives:

$$l_p t = \pi r_T^2 - \pi r_h^2$$

Substituting the definition for $r_T$ gives:

$$l_p t = \pi \left[r_h + \frac{C_p t}{N}\right]^2 - \pi r_h^2$$

Expanding and simplifying:

$$l_p t = \pi \left[r_h^2 + 2\frac{C_p t r_h}{N} + \left(\frac{C_p t}{N}\right)^2\right] - \pi r_h^2$$

$$= \pi \left[\frac{2 C_p t r_h}{N} + \frac{C_p^2 t^2}{N^2}\right]$$

$$= \pi r_h^2 \left[\frac{2 C_p t}{N r_h} + \frac{C_p^2 t^2}{N^2 r_h^2}\right]$$

$$= N r h \left[1 + \frac{2 C_p t}{N r_h} + \left(\frac{C_p t}{N r_h}\right)^2 - 1\right]$$

$$l_p t = \pi r_h^2 \left[\left[1 + \left(\frac{C_p t}{N r_h}\right)\right]^2 - 1\right]$$

$$l_p = \frac{\pi r_h^2}{t}\left[\left[1+\frac{C_p t}{N r_h}\right]^2 - 1\right] \qquad \text{eq. 1.4}$$

CONVERTING TAPE POSITION TO TAPE RADIUS

Given:
 Hub radius ($r_h$)
 Tape position ($l_p$)
 Tape thickness (t)
Find:
 Tape radius ($r_T$)
Solution:
 Equations 1.1 and 1.2 are set equal to each other:

$$l_p t = \pi r_T^2 - \pi r_h^2$$

Solving for $r_T$:

$$\frac{l_p t}{\pi} = r_T^2 - r_h^2$$

$$r_T^2 = \frac{l_p t}{\pi} + r_h^2$$

$$= \frac{l_p t r_h^2}{\pi r_h^2} + r_h^2$$

$$r_T^2 = r_h^2\left[\frac{l_p t}{\pi r_h^2} + 1\right]$$

$$r_T = \sqrt{r_h^2\left[\frac{l_p t}{\pi r_h^2} + 1\right]}$$

$$r_T = r_h\sqrt{\frac{l_p t}{\pi r_h^2} + 1} \qquad \text{eq. 2.1}$$

CONVERTING TAPE POSITION TO ENCODER COUNTS

Given:
 Tape thickness (t)
 Encoder counts per revolution (N)
 Hub radius ($r_h$)
 Length of tape currently on reel ($l_p$)
Find:
 Number of encoder counts ($C_p$) required to wrap $l_p$ tape onto the reel
Solution:
 From equation 1.3:

$$r_T = r_h + \frac{C_p t}{N}$$

Solving for $C_p$:

$$\frac{C_p t}{N} = r_T - r_h$$

$$C_p = \frac{N}{t}(r_T - r_h) \qquad \text{eq. 3.1}$$

Note: Calculate $r_T$ via equation 2.1

FIND INITIAL POSITION

Given:
 Rotate reel B after measuring encoder positions on each reel ($C_{A1}$, $C_{B2}$)
 Measure final encoder positions ($C_{A2}$, $C_{B1}$)
 Calculate change in positions:

$$\Delta C_A = C_{A2} - C_{A1}$$

$$\Delta C_B = C_{B2} - C_{B1}$$

Figure 15:
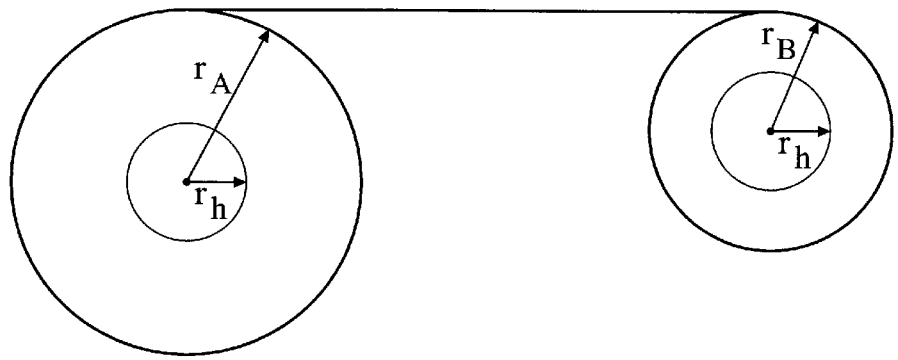
FIG. 15 is a diagram showing the hub and tape radius of both reels.

Total tape length ($l_T$)
 Hub radius ($r_h$), see FIG. 15.
Find:
 Absolute encoder positions for A/B reels ($C_A$, $C_B$)
Solution:
 If we assume that the radius of each reel changes very little over the course of the measurement (from start to finish positions), then the length of tape given up by reel A is:

$$\Delta l_A = r_A \theta_A$$

and the length of added to reel B is:

$$\Delta l_B = r_B \theta_B$$

the angles rotated by reels A and B are:

$$\theta_A = \frac{2\pi \Delta C_A}{N}$$

$$\theta_B = \frac{2\pi \Delta C_B}{N}$$

the length of tape given up by reel A must equal the length of tape taken in by reel B:

$$r_A \theta_A = r_B \theta_B$$

Substituting angles for the change in counts:

$$r_A \frac{2\pi \Delta C_A}{N} = r_B \frac{2\pi \Delta C_B}{N}$$

simplifying:

$$r_A \Delta C_A = r_B \Delta C_B \qquad \text{eq. 4.1}$$

The total area of the tape must equal the area of tape on each reel:

$$l_T t = (\pi r_A^2 - \pi r_h^2) + (\pi r_B^2 - \pi r_h^2) \qquad \text{eq. 4.2}$$

From eq. 4.1:

$$r_A = r_B \frac{\Delta C_B}{\Delta C_A} \qquad \text{eq. 4.3}$$

Substitute eq. 4.3 into eq. 4.2

$$l_T t = \pi\left(r_B \frac{\Delta C_B}{\Delta C_A}\right)^2 - \pi r_h^2 + \pi r_B^2 - \pi r_h^2$$

Solving for $r_B$ $$l_T t = \pi r_B^2 \left(\frac{\Delta C_B}{\Delta C_A}\right)^2 + \pi r_B^2 - 2\pi r_h^2$$

$$l_T t + 2\pi r_h^2 = \pi r_B^2 \left[\left(\frac{\Delta C_B}{\Delta C_A}\right)^2 + 1\right]$$

$$r_B^2 \left[\left(\frac{\Delta C_B}{\Delta C_A}\right)^2 + 1\right] = \frac{l_T t + 2\pi r_h^2}{\pi}$$

$$r_B^2 = \frac{\frac{(l_T t) + 2\pi r_h^2}{\pi}}{\left(\frac{\Delta C_B}{\Delta C_A}\right)^2 + 1}$$

$$r_B = \sqrt{\frac{\frac{(l_T t) + 2\pi r_h^2}{\pi}}{\left(\frac{\Delta C_B}{\Delta C_A}\right)^2 + 1}} \qquad \text{eq. 4.4}$$

To find $C_B$, use equation 3.1 $C_B = C_p = N/t(rT-rh)$, with $r_T = r_B$.

To find $C_A$, use same method, only swap $\Delta C_B / \Delta C_A$ and let $r_T = r_A$.

CALCULATE DYNAMIC MOTOR TORQUE

Figure 16:
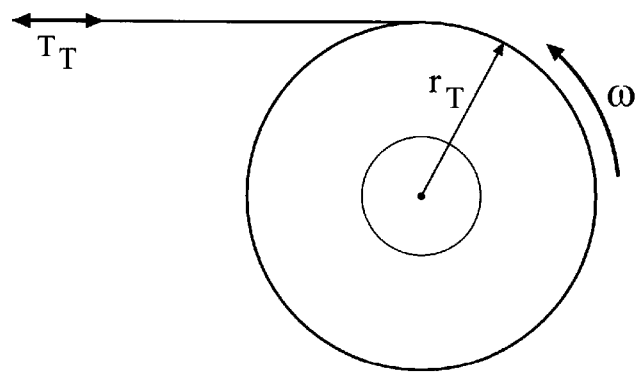
FIG. 16 is a diagram showing tape tension.

Given:
Tape radius ($r_T$); see FIG. 16
Tape acceleration ($a_T$)
Tape velocity ($v\tau$)
Tape tension ($T_T$)

Find:
Torque ($\tau_m$) that must be applied to motor to achieve the required tape tension.

Solution:
The torque required to produce the tape tension is:

$$\tau_T = T_T r_T \qquad \text{eq. 5.1}$$

The sum of all torques operating on the reel is:

$$\tau_m = \tau_I + \tau_T - \tau_f - \tau_v \qquad \text{eq. 5.2}$$

where
$\tau_m$ torque applied to motor
$\tau_I$ torque due to inertia (eq. 5.3)
$\tau_T$ torque due to tape tension (eq. 5.1)
$\tau_f$ torque due to (dynamic coulomb) friction (fixed constant)
$\tau_v$ torque due to viscous friction (eq. 5.6)

The inertial term is ilrer divided into two terms:

$$\tau_I = \tau_{IM} + \tau_{IT} \qquad \text{eq. 5.3}$$

where
$\tau_{IM}$ inertial torque due to motor (eq. 5.4)
$\tau_{IT}$ inertial torque due to tape (eq. 5.5)
Motor inertia torque is calculated as:

$$\tau_{IM} = I_m \frac{a_T}{r_T} \qquad \text{eq. 5.4}$$

where
$I_m$ motor torque (calibration constant)
$a_T$ tape acceleration
$r_T$ tape radius
Tape inertia torque is calculated as:

$$\tau_{IT} = I_T \frac{a_T}{r_T}$$

The tape inertia must be calculated from the tape weight ($W_T$) and the tape length/thickness and the current radius. The mass moment of inertia for a flat disk of density $\rho$ and width w is:

$$I_{disk} = \frac{1}{2} \rho w \pi r^4$$

for the tape disk with a hole where the hub is, the moment of inertia is:

$$I_T = \frac{1}{4} \rho w \pi (r_T^4 - r_h^4)$$

the mass of the tape is:

$$M_T = W_T \left(\frac{1}{32 \text{ ft/sec}^2 \, 12 \text{ in/ft}}\right)$$

the density of the tape is $$\rho = \frac{M_T}{l_T t w}$$

substituting:

$$I_T = \frac{1}{2}\left(\frac{M_T}{l_T t w}\right) w \pi (r_T^4 - r_h^4)$$

$$= \frac{\pi M_T}{2 l_T t}(r_T^4 - r_h^4)$$

substituting weight for mass:

$$I_T = \frac{\pi w_T \cdot (r_T^4 - r_h^4)}{2 l_T t 3213}$$

-continued $$I_T = \frac{\pi w_T \cdot (r_T^4 - r_h^4)}{43213I_T t}$$ eq. 5.5

The viscous friction is proportional to the angular velocity, and is calculated as $$\tau_v = K_v \frac{v_T}{2\pi r_T}$$ eq. 5.6 where
$K_v$ is a config constant for the viscous friction slope

HIGH SPEED MOTOR CONTROL

Figure 18:
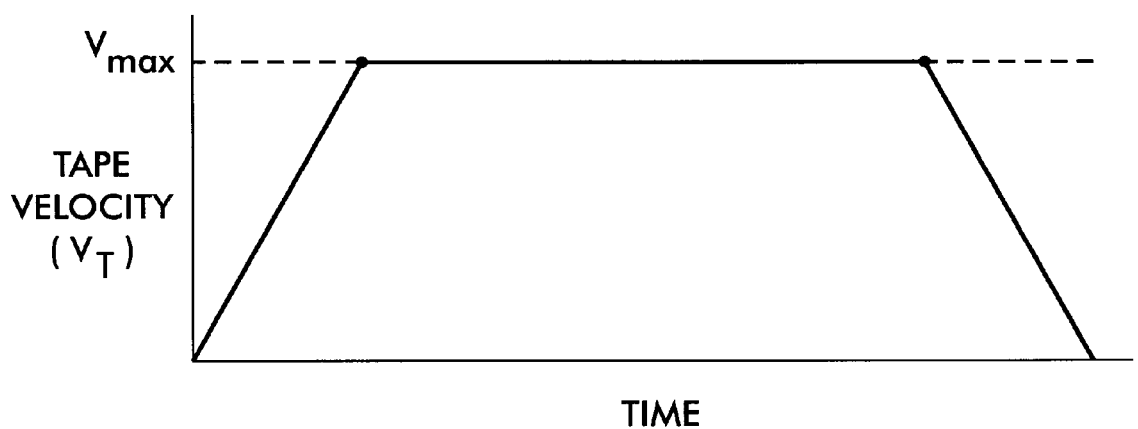
FIG. 18 is a graph of tape velocity as a function of time.

To move tape at high velocity/acceleration from reel A to reel B from position $l_0$ to position $l_1$
Algorithm:
Generate a velocity function for the tape using constant acceleration ($a_r$) and maximum velocity ($v_{max}$). The resulting function when plotted against time is a trapezoid, see FIG. 18.

Note that the function may not be a trapezoid if $l_0$ and $l_1$ are too close to permit acceleration to maximum velocity.

Figure 17:
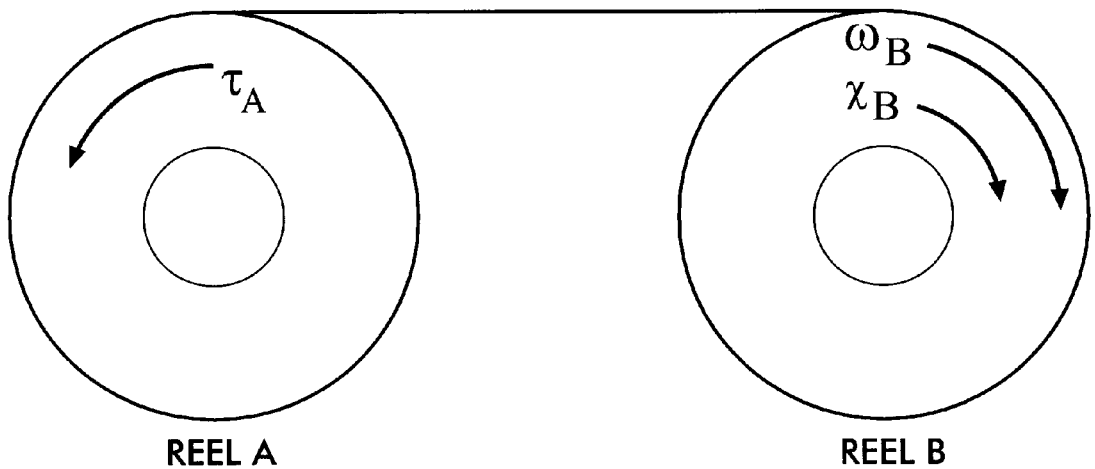
FIG. 17 shows the torque on reel A and the corresponding acceleration and angular velocity on reel B.

Divide the interval between $l_0$ and $l_1$ into n equal distances such that $$n = \frac{l_1 - l_0}{\Delta l}$$

where $\Delta l$ is the distance between updates (config constant)
Now build a table of n elements, where each element, see FIG. 17 contains:
 Encoder position on reel B to do update ($\theta_B$)
 Angular velocity to program into reel B ($\omega_B$)
 Angular acceleration to program into reel B ($\alpha_B$)
 Torque to program into reel A ($\tau_A$),
 Enter table at first entry and program motors.
 Wait until motor B has reached position of next entry.
 Program next entry into motors.
 When all entries are exhausted, stop.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. In a recording system comprising two reels, one being a supply reel and the other being a drive reel, each reel having an associated hub, position encoder and motor, a method of randomly recording and accessing data in the form of blocks in a continuous data recording tape wound on said reels comprising the steps of:

A. recording said data on said tape comprising the steps of:
  positioning said tape at a point where recording is to be started,
  setting a reel encoder counter which generates a current count of reel rotations to a starting value,
  dividing said data into a current and remaining blocks,
  adding said current count to said current block,
  recording said current block, which includes said current count, onto said tape while advancing said tape, thereby generating a new count, and
  repeating said adding and recording steps for said remaining blocks, and
 B. accessing a target block comprising the steps of:
  reading said current block to determine a count,
  computing a number of rotations that must be turned by one reel to access said target block, and
  driving said tape said number of rotations while maintaining tension on said tape to a predetermined level,
  the tension being determined by calculating from the tape radius the amount of torque that must be applied to the supply reel.

2. The system of claim 1 wherein the number of rotations that is actually required to proceed from a current block to a target block is compared to the computed number, the result being used to correct the process for computing the number of rotations that must be turned.

* * * * *